United States Patent [19]
Skinner

[11] Patent Number: 5,377,350
[45] Date of Patent: Dec. 27, 1994

[54] SYSTEM FOR COOPERATIVE COMMUNICATION BETWEEN LOCAL OBJECT MANAGERS TO PROVIDE VERIFICATION FOR THE PERFORMANCE OF REMOTE CALLS BY OBJECT MESSAGES

[75] Inventor: Harold R. Skinner, Rochester, Minn.

[73] Assignee: International Business Machines Corporation, Armonk, N.Y.

[21] Appl. No.: 56,120

[22] Filed: Apr. 30, 1993

[51] Int. Cl.$^5$ .............................................. G06F 15/40
[52] U.S. Cl. ..................... 395/600; 395/200; 395/575; 395/650; 395/700; 364/DIG. 1; 364/280; 364/281.3; 364/281.7; 364/284.3; 364/286
[58] Field of Search ............... 395/200, 575, 600, 650, 395/700

[56] References Cited

U.S. PATENT DOCUMENTS

| | | | |
|---|---|---|---|
| 4,961,137 | 10/1990 | Augusteijn et al. | 395/800 |
| 5,016,162 | 5/1991 | Epstein et al. | 395/775 |
| 5,058,185 | 10/1991 | Morris et al. | 382/41 |
| 5,151,987 | 9/1992 | Abraham et al. | 395/575 |
| 5,206,951 | 4/1993 | Khoyi et al. | 395/650 |
| 5,265,206 | 11/1993 | Shackelford et al. | 395/200 |
| 5,291,593 | 3/1994 | Abraham et al. | 395/600 |
| 5,313,629 | 5/1994 | Abraham et al. | 395/600 |
| 5,339,435 | 8/1994 | Lubkin et al. | 395/700 |

OTHER PUBLICATIONS

Keene, *Object-Oriented Programming in Common Lisp*, Addison-Wesley, 1988.
Kim, *Introduction to Object-Oriented Databases*, MIT Press, 1990.
*Object Data Manager*, IBM Technical Disclosure Bulletin, vol. 32, No. 10A, Mar. 1990, pp. 55–57.
*Cooperative Processing in an Object-Oriented Environment*, IBM International Technical Support Centers, GG24-3081, Dec. 1991.

Primary Examiner—Thomas G. Black
Assistant Examiner—Wayne Amsbury
Attorney, Agent, or Firm—Bell, Seltzer, Park & Gibson

[57] ABSTRACT

Object managers on different computing platforms communicate with each other in a cooperative manner, while allowing the objects on the computing platforms to communicate with each other using a remote procedure call which preserves the object oriented characteristics of data independence and encapsulation. Preferably, each object manager indicates to the other object manager whether local objects have successfully responded to remote messages. The object manager can thereby preserve integrity of the object oriented system by committing or rolling back the system in response to completion of specific tasks or failure to complete specific tasks, even though some of the tasks occurred outside the local object oriented computing environment.

22 Claims, 10 Drawing Sheets

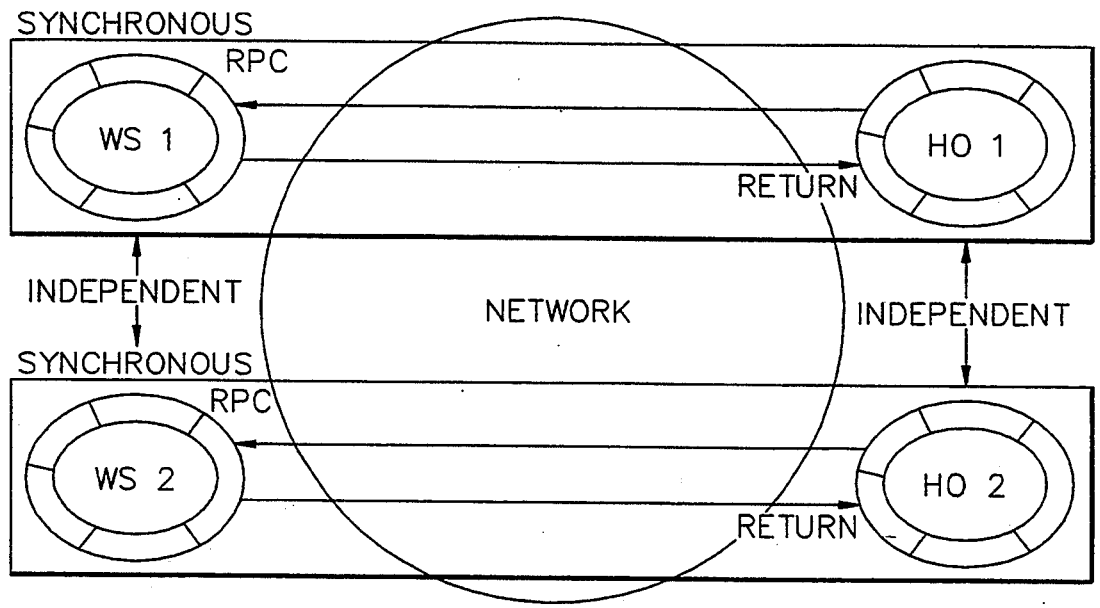
FIG. 6.
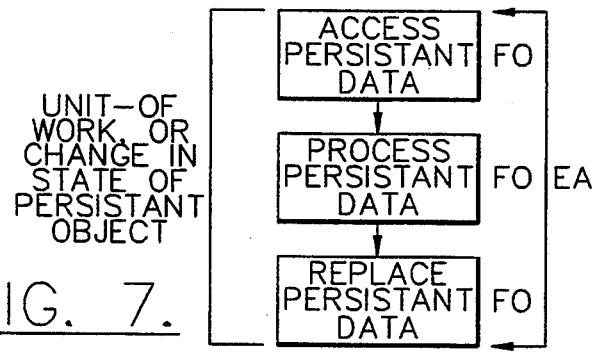
FIG. 7.
FIG. 8.
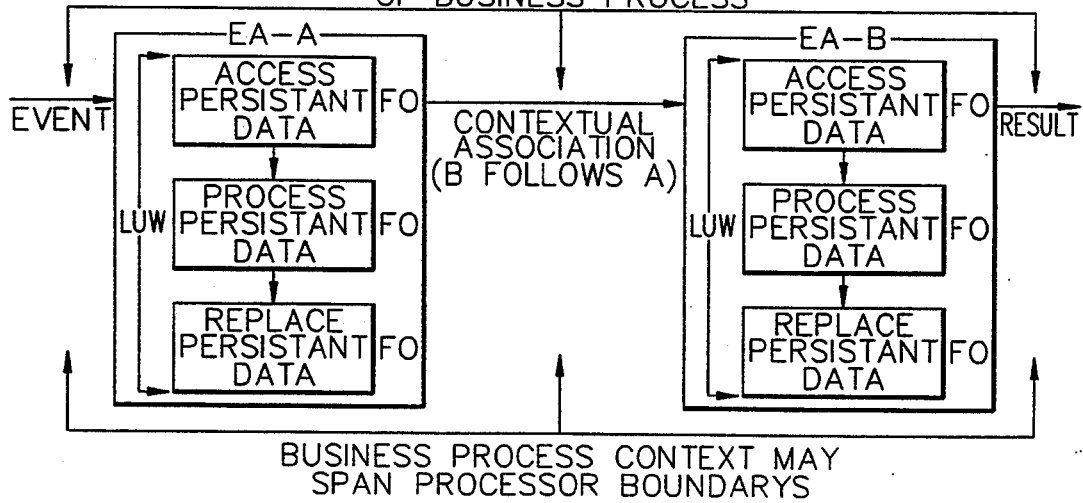

SYSTEM FOR COOPERATIVE COMMUNICATION BETWEEN LOCAL OBJECT MANAGERS TO PROVIDE VERIFICATION FOR THE PERFORMANCE OF REMOTE CALLS BY OBJECT MESSAGES

FIELD OF THE INVENTION

This invention relates to data processing systems and methods and more particularly to object oriented computing systems and methods.

BACKGROUND OF THE INVENTION

Object oriented programming systems and processes, also referred to as "object oriented computing environments", have been the subject of much investigation and interest in state of the art data processing environments. As is well known to those having skill in the art, object oriented computing environments are composed of a large number of "objects". An object is a data structure, also referred to as a "frame", and a set of operations or functions, also referred to as "methods", that can access that data structure. The frame has many "slots", each of which contains an "attribute" of the data in the slot. The attribute may be a primitive (such as an integer or string) or an object reference which is a pointer to another object.

Each defined object will usually be manifested in a number of "instances". Each instance contains the particular data structure for a particular example of the object. Each instance of an object is identifiable by an assigned "instance identifier". In an object oriented computing environment, data is processed by requesting an object to perform one of its methods by sending the object a "message" which names an instance of an object and a method of that object. The receiving object responds to the message by choosing the method that implements the message name, executing this method on the named instance, and returning control to the calling mechanism along with the results of the method. The sending and receiving of messages is typically controlled by an object manager.

Object oriented computing environments provide two primary characteristics which allow flexible and reusable programs to be developed. These characteristics are referred to as "encapsulation" and "inheritance". As already described, each object frame is encapsulated by its surrounding methods so that all access to the frame is handled by the surrounding methods. Data independence is thereby provided because an object's data structure is accessed only by its methods. The "inheritance" property allows previously written programs to be broadened by creating new superclasses and subclasses of objects. New objects are described by how they differ from preexisting objects so that entirely new programs need not be written to handle new types of data or functions.

As object oriented computing environments become increasingly used to perform complex data processing tasks, it has become desirable to allow objects in a first object oriented computing environment to interact with objects in a second object oriented computing environment. Thus, for example, a first object oriented computing environment may be located in a client computer while a second object oriented computing environment may be located in a server computer. In this scenario, it is desirable to allow objects on the client to access objects in the server and objects in the server to access objects in the client as part of an overall computing task.

A "remote procedure call" mechanism has been provided in object oriented computing environments in order to allow this interaction. In a remote procedure call, a client stub and a server stub are provided in the object manager of each object oriented computing environment. The client stub determines whether a message is directed to an object which is outside its own object oriented computing environment. If so, the client stub packages this message for transmission across a communications network to the remote object oriented computing environment. At the remote object oriented computing environment, a server stub receives this message and reforms the message so that it can be used by the object on the remote object oriented computing environment.

After processing, the server stub packages the processed data for return back to the originating object oriented computing environment via the communications network and the client stub unpackages this message and provides it to the requesting object. Thus, the object in the originating environment which sends the message has no knowledge that the message is being processed by an object in a remote environment. Similarly, the object in the remote environment which processes the message has no knowledge that the message originated from the remote originating environment. Thus, the fundamental object oriented characteristic of encapsulation is preserved because neither the sending object nor the receiving object has knowledge of the internal data structure or methods of the receiving object or sending object, respectively.

Cooperative processing has also been used in object oriented data processing systems in order to accommodate large and/or complex processing tasks. In cooperative processing, two or more computing platforms cooperate to accomplish a task. Functions and applications are split into two or more components running in different computing platforms.

Interfaces and protocols have been designed to allow cooperative processing in an object oriented environment. See the publication entitled *Cooperative Processing In An Object-Oriented Environment*, document number GG24-3801-00, December 1991 by Deckers et al. published by the assignee of the present invention. However, in some respects, cooperative processing is antithetical to an object oriented scenario. For example, as described above, object oriented systems on single or multiple computing environments require that each object have no knowledge of the internal workings of any other object. Thus, a local procedure call or a remote procedure call does not require any knowledge by the calling object of the internal methods or data of the called object. In contrast, in a cooperative environment, where tasks are divided and processing of one task requires knowledge of the results of earlier tasks, knowledge of the objects across system boundaries are required. This requirement of knowledge can corrupt the important characteristic of encapsulation. Thus, coordination of cooperative processing may corrupt the very notion of encapsulation and independence of objects in an object oriented computing environment.

SUMMARY OF THE INVENTION

It is therefore an object of the present invention to provide an improved object oriented computing environment.

It is another object of the present invention to provide an object oriented computing environment which can operate in a cooperative processing environment while still maintaining object encapsulation and independence.

These and other objects are provided, according to the invention, by allowing the object managers on each computing platform to communicate with each other in a cooperative manner, while allowing the objects on the computing environments to communicate with each other using a remote procedure call which, as previously described, preserves the object oriented characteristics of data independence and encapsulation.

In particular, an object oriented cooperative data processing system according to the invention includes a first object oriented computing environment executing on a first computing platform. The first object oriented computing environment includes a plurality of first objects and a first object manager. Similarly, a second object oriented computing environment executing on a second computing platform includes a plurality of second objects and a second object manager for the second objects. A communications network or other known means is used for connecting the first computing environment and the second computing environment.

According to the invention, the first object manager indicates whether the first objects successfully performed messages from the second objects and receives from the second object manager indications of whether the second objects successfully performed messages from the first objects. Similarly, the second object manager indicates to the first object manager, whether the second objects successfully performed messages from the first objects and receives from the first object manager indications of whether the first objects successfully performed messages from the second objects. It will be understood by those having skill in the art that the indicator may be provided by a "successful completion code" or by an "error code" which indicates lack of successful performance.

Thus, when performance of a method by a remote object as a result of cooperative processing, is important to the local object manager in order to preserve data integrity of the cooperative processing application, the local object manager will have knowledge of this successful performance even though the local objects themselves do not have knowledge of the successful performance by the remote objects. The originating object manager can thereby preserve integrity of the object oriented system by committing or rolling back the system in response to completion of specific tasks or failure to complete specific tasks even though some of the tasks occurred outside the originating object oriented computing environment. Cooperative data processing is thereby provided without impacting the basic object oriented characteristics of encapsulation and data independence.

A particular implementation of an object oriented cooperative data processing system according to the invention includes a first local object manager on the first computing platform including means for directing action messages between the plurality of first objects on the first computing platform. Similarly, a second object oriented computing environment includes a plurality of second objects and a second local object manager including means for directing action messages between the plurality of second objects. The first object oriented computing environment also includes a client stub for identifying a first action message from one of the first objects which is directed to one of the second objects on the second platform and a first conversation server which is responsive to the client stub for transmitting a first action message to the particular second object.

The second object oriented computing environment includes a second conversation server for determining whether the particular second object successfully performed the first action message and for providing to the first local object manager an indication that the second object successfully performed the first action message. Similarly, the second object oriented computing environment includes a second client stub for identifying a second action message from one of the second objects which is directed to one of the first objects.

The second conversation server is responsive to the second client stub for transmitting the second action message to the first object. The first conversation server also includes means for determining whether the first object successfully performed the second action message, and for providing to the second local object manager an indication that the first object successfully performed the second action message. Thus, each local object manager becomes cognizant of successful performance by remote objects which are part of its cooperative processing task, and can coordinate its cooperative processing based on completion or failure of completion of the remote task.

In a preferred embodiment of the present invention, each object manager includes a unit of work manager for assigning units-of-work to selected objects. As is known to those having skill in the art, a unit-of-work is an object class including multiple unit-of-work objects and multiple unit-of-work instances. The unit-of-work allows an object oriented system to manipulate, update, allocate and discard memory in terms of sets of objects and operations upon objects rather than by manipulating memory pointers as in traditional languages like C and Pascal. According to the invention, the first object manager further comprises means for assigning selected ones of the first objects and selected ones of the second objects to a unit-of-work, and the indication providing means also provides to the first object manager a unit-of-work identification associated with the second object along with the indication of whether the second object successfully performed the first action message. Similarly, the second object manager includes means for assigning selected ones of the first objects and selected ones of the second objects to a unit-of-work, and the indication providing means further comprises means for providing to the second object manager the unit of work identification associated with the second object along with the indication of whether the second object successfully performed the first action message. Thus, units-of-work can be spread across computing systems but managed by the unit-of-work manager in the originating system. Either unit-of-work manager may originate the unit-of-work instance.

BRIEF DESCRIPTION OF THE DRAWING

FIG. 6 schematically illustrates independent calls between objects in an object oriented computing environment.

FIG. 7 schematically illustrates a standalone unit-of-work in an object oriented computing environment.

FIG. 8 schematically illustrates a business process unit-of-work in an object oriented computing environment.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Prior to describing the present invention, a general overview of an object oriented computing environment will be described. An overview of remote procedure call processing will be provided followed by an overview of unit-of-work processing and cooperative processing. The present invention will then be described generally and specific implementations will be provided for describing the operation of the cooperative object managers according to the present invention.

Object Oriented Computing Environment

In an object oriented computing environment, work is accomplished by sending action request messages to an object which contains data. The object will perform the requested action on the data according to its predefined methods. Objects may be grouped into object classes which define the types and meanings of the data, and the action requests (messages) that the objects in the class will honor. The individual objects containing data are called "instances" of the object. Object classes are defined to be subclasses of other classes. Subclasses inherit all of the data characteristics and methods of the parent class. They can add additional data and methods and they can override or redefine any data elements or methods of the parent class.

An object or object class is typically represented schematically by a circular or oval ring in which the center of the ring contains the frame (data structure) having slots, each of which contains an attribute of the data in the slot. Sectors of the ring are used to indicate the object's methods which encapsulate the frame and may be used to perform actions on the data encapsulated in the frame of object instances.

Figure 1:
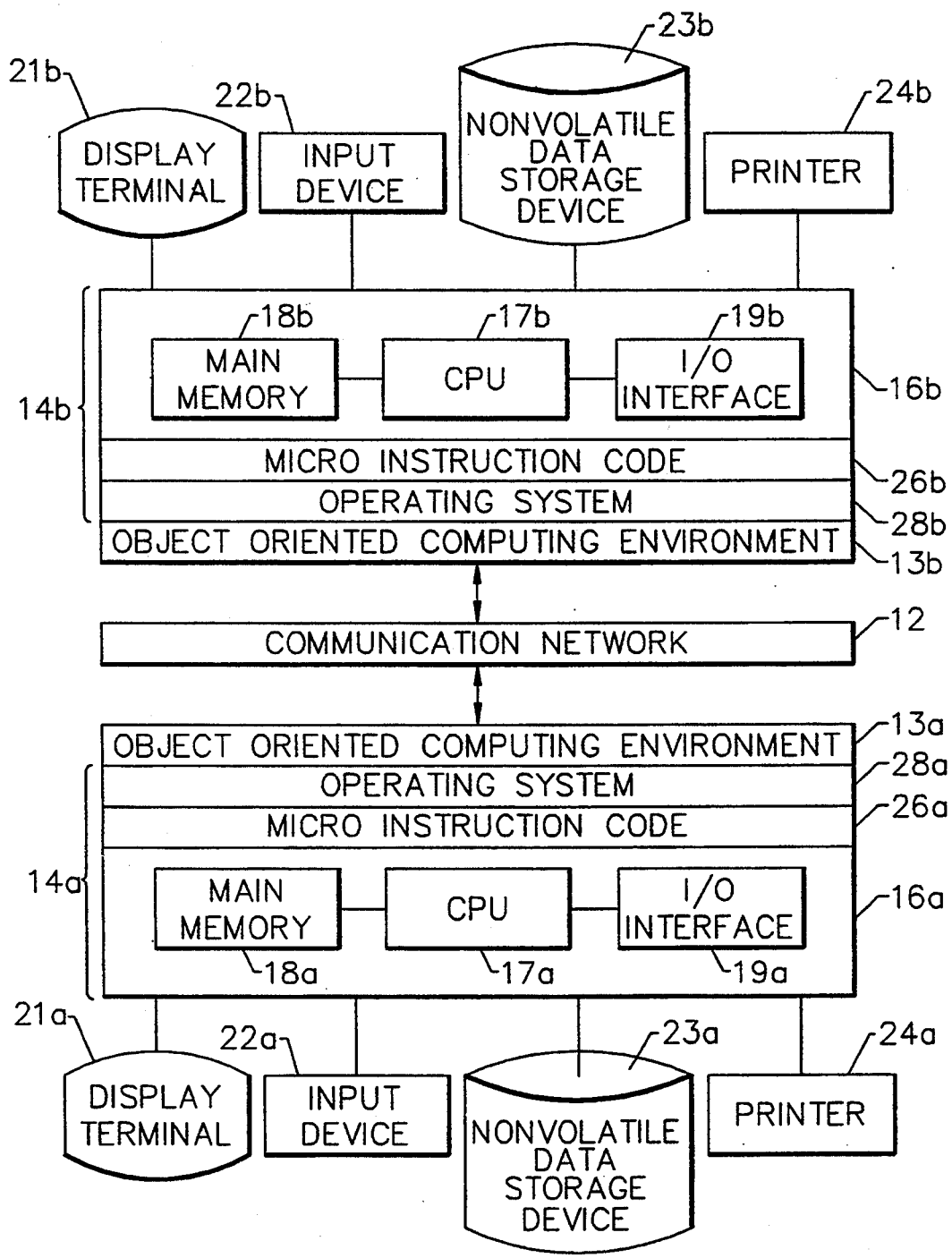
FIG. 1 schematically illustrates a hardware and software environment in which the present invention operates.

Referring now to FIG. 1, a hardware and software environment in which the present invention operates will now be described. As shown in FIG. 1, the present invention is an apparatus and process for linking object managers for cooperative processing in an object oriented computing environment. As shown, object oriented computing environments 13a, 13b operate on respective computer platforms 14a, 14b. It will be understood by those having skill in the art that each of computer platforms 14a, 14b typically include computer hardware units 16a, 16b such as a central processing unit (CPU) 17a, 17b, main memory 18a, 18b and an input/output (I/O) interface 19a, 19b, and may include peripheral components such as a display terminal 21a, 21b, an input device 22a, 22b such as a keyboard or a mouse, nonvolatile data storage devices 23a, 23b such as magnetic or optical disks, printers 24a, 24b and other peripheral devices. Computer platforms 14a, 14b also typically include microinstruction code 26a, 26b and an operating system 28a, 28b.

It will be understood by those having in the art that each computer platform 14 may comprise a plurality of central processing units. Conversely, computing platforms 14a and 14b may run on a single central processing unit 17a or 17b. It will also be understood by those having skill in the art that the computing platforms 14a, 14b may each be mainframe computers, minicomputers or workstations. In a typical scenario, computing platform 14a is a workstation and computing platform 14b is a host or mainframe computer.

As one example, each computing platform 14a and 14b may be a computer having an IBM System 370 architecture. Operating systems 28a, 28b may be an IBM multiple virtual storage (MVS) operating system. Object oriented computing environments 13a, 13b are preferably written in Intermediate C, which is an object oriented dialect of the C computer programming language and is similar to the C++ computer programming language. The design and operation of computer platforms and object oriented computing environments are well known to those having skill in the art and are described, for example in U.S. Pat. Nos. 5,161,225 to Abraham et al. entitled *Persistent Stream for Processing Time Consuming and Reusable Queries in an Object Oriented Database Management System*; 5,151,987 to Abraham et al. entitled *Recovery Objects in an Object Oriented Computing Environment*; and 5,161,223 to Abraham entitled Resumeable Batch Query for *Processing Time Consuming Queries in an Object Oriented Database Management System*, all assigned to the assignee of the present invention, the disclosures of which are hereby incorporated herein by reference, and in numerous textbooks such as *Object Oriented Software Construction* by Bertrand Meyer, published by Prentice Hall in 1988, the disclosure of which is hereby incorporated herein by reference.

Figure 2:
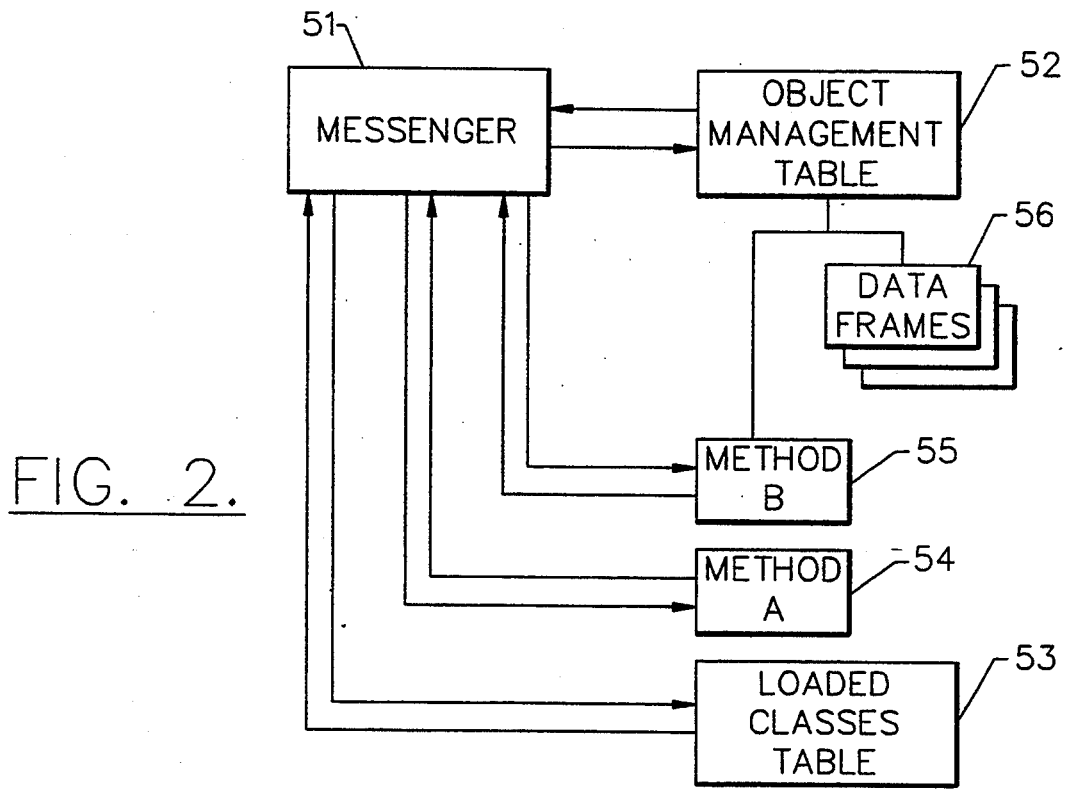
FIG. 2 schematically illustrates components of an object oriented computing environment of FIG. 1.
Figure 5:
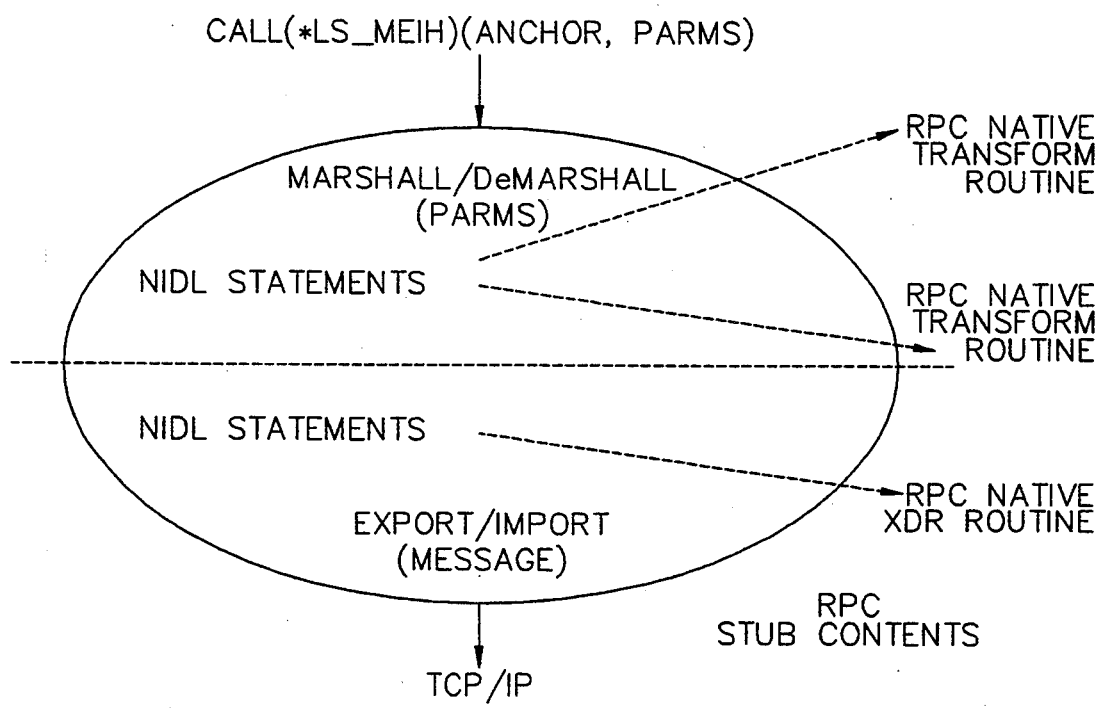
FIG. 5 schematically illustrates details of an object oriented remote procedure call stub.

Referring now to FIG. 2, which is a reproduction of FIG. 5 of the aforesaid U.S. Pat. No. 5,161,225 to Abraham et al., the main components of an object oriented computing environment (13a, 13b FIG. 1) will be described. A detailed description of the design and operation of an object oriented program is provided in "Object Oriented Software Construction", by Bertrand Meyer, published by Prentice Hall in 1988, the disclosure of which is incorporated herein by reference.

Referring to FIG. 2, each object oriented computing environment 13a, 13b includes three primary components: a Messenger 51, an Object Management Table 52 and a Loaded Classes Table 53. The Messenger 51 controls communication between calling and called messages, Object Management Table 52 and Loaded Classes Table 53. Object Management Table 52 contains a list of pointers to all active object instances. The Loaded Classes Table 53 contains a list of pointers to all methods of active object classes.

Operation of the object oriented computing environment 13a, 13b now be described for the example illustrated in FIG. 2, in which Method A (block 54) of an object sends a message to Method B (block 55) of an object. Method A sends a message to Method B by calling Messenger 51. The message contains (1) an object reference of the instance to receive the message, (2) the method the object instance is requested to perform on the data it encapsulates, and (3) any parameters needed by the receiving method. Messenger 51 obtains a pointer to the data frame 56 of the instance object specified by Method A, by searching Object Management Table 52 for the instance object. If the specified instance object cannot be found, Object Management Table 52 adds the instance object to the table and calls the instance to materialize its data from the database. Once in the instance table, Object Management Table 52 returns the pointer to the materialized instance object.

Messenger 51 then obtains the address of Method B from the Loaded Classes Table 53. If the instance's class is not loaded, the Loaded Classes Table 53 will load it at this time to materialize its data. The Loaded Classes Table 53 searches for the specified method (Method B) and returns the address of the method to Messenger 51.

The Messenger 51 then calls Method B, passing it a system data area and the parameters from the call made by Method A including the pointer. Method B accesses the data frame 56 using the pointer. Method B then returns control to the Messenger 51 which returns control to Method A.

When one object needs to invoke the method(s) of another object, it sends the target a message requesting that a certain method be performed on (or with) the target object's data. This behavior may cause other message(s) to be emitted, expanding the overall behavior that is executed. Each message is comprised of the object and action to be exercised, and is known as an object-action message.

When data that is accessible by multiple objects is processed, the state of that data, within the context that the user has defined, must be managed. Data must be recoverable in the same context that it is used. If an update to data that is contextually related to other data fails, then prior updates to related data may be contextually invalid and must be undone to the state that existed prior to their update Contextually related data is managed by what is known as a Unit-of-Work. Data that has completed all state changes in a contextual relationship must be committed to the data base. When an error occurs, data must be recovered, or rolled back to the original state.

Remote Procedure Call (RPC) Processing

The procedure call (also referred to as a function call or subroutine call) is a well-known technique for transferring control to a separate process, with a return of control to the caller. The result of the call, or behavior, is then available to the caller. Associated with the call, is a set of arguments that are passed from the caller, or client, to the callee, or server. Usually, there are return values, representing the behavior result, which are returned from the called procedure.

Typically the caller and callee are within the same process on a given computing platform. These calls are known as local procedure calls. When the caller and callee are not in the same process or on the same platform, a different type of mechanism must be used. This mechanism is known as a Remote Procedure Call, or RPC.

In an object-oriented computing environment, a call results in a message, from one object to another, containing a request for an action to be performed on/with the target object. With RPC, this relationship is maintained, with the message delivered to a remote object for execution. The RPC mechanism employs the use of stubs to provide the isolation of the target, or server location.

Figure 3:
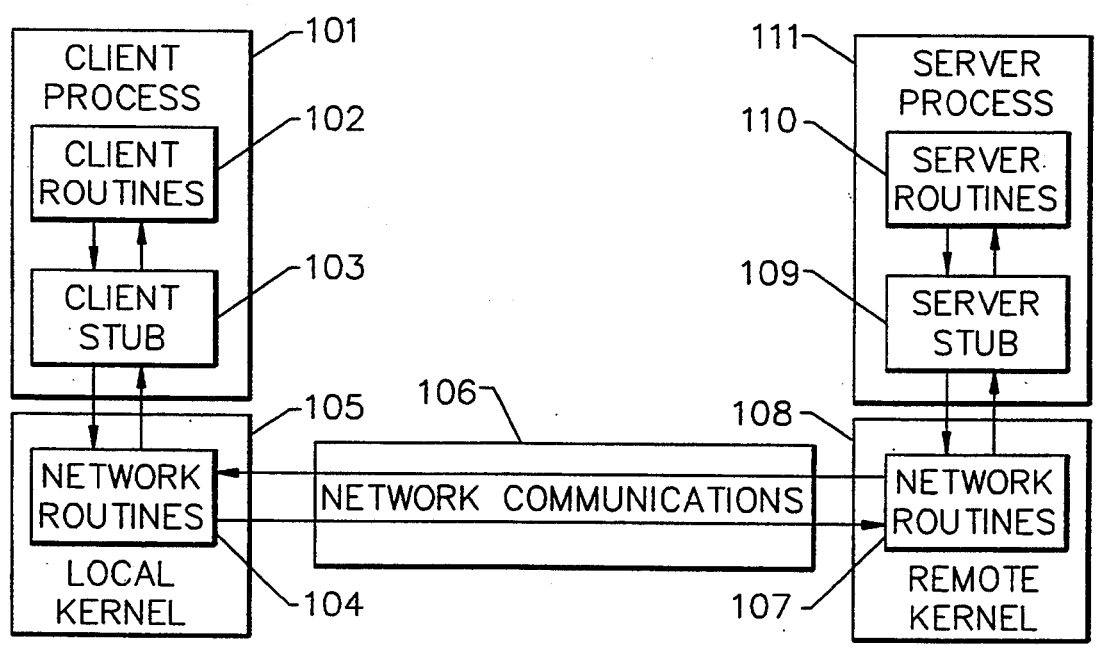
FIG. 3 illustrates a schematic block diagram of a remote procedure call.

Referring now to FIG. 3, a schematic block diagram of a remote procedure call is illustrated. As shown, a client routine 101 in the client (originating) process 102 calls a local procedure, termed the client stub 103. The client stub appears to the client process as the actual server process that it wants to call. The client stub packages the call arguments for the call to the remote server process. The packaging and transformation of the arguments into network format streams is known as "marshalling" Thus, the client stub 103 builds a packet containing the object-action message to be routed to the remote procedure (object). The marshalled stream(s) are sent to network routines 104 in the local platform's communications subsystem 105. The communications subsystem services 106 transport the marshalled streams to the remote network routines 107 in the remote platform's communication subsystem 108 using networking mechanisms.

The remote network routines 107 route the message to the server stub 109 of the called process. The server stub 109 performs the decomposition of the network steams (packeted message) into the arguments and format required by the server process. This transformation and decomposition is known as "unmarshalling". The server stub 109 then calls the server routines 110 in server process 111, passing the arguments. The server process 111 is executed, producing the result, which is returned to the server stub 109. The server stub 109 marshals the returned result into one or more network format streams, and sends them back to the networking routines 107 in the remote communications subsystem.

The communications subsystem 106 and network transport mechanisms route the return back to the originating system 105 and the client stub 103. Finally, the client sub 103 unmarshals the return, and returns the results to the client process 101. Thus, this process appears to the client process to be a normal procedure call to another local process.

Figure 4:
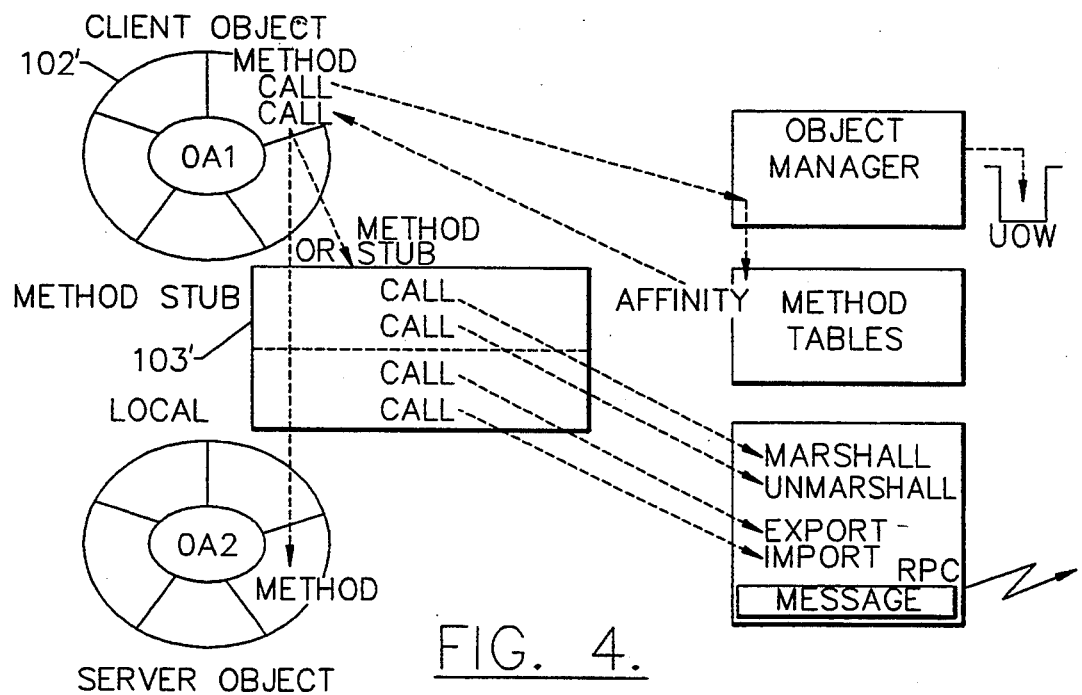
FIG. 4 schematically illustrates remote procedure call operation in an object oriented computing environment.

FIG. 4 illustrates a remote procedure call operation in an object oriented computing environment. The client object 102' sends a message by issuing a call, which is received by the object manager. The object manager captures the action request as part of the unit-of-work, and determines that the server object's affinity is local to the client object. The message is then sent to the local server object for execution.

If the object manager had determined that the server object had remote affinity, the message is sent to a client method stub 103', where remote procedure call functions to marshall and transmit the message are executed, to send the message to the remote instance of the server object (not illustrated). When the remote server object is completed, its behavior is returned back to the client object, using the remote procedure call mechanism. The client object remains uninformed of the location of the server object. Thus, encapsulation is retained.

FIG. 5 illustrates details of the object oriented RPC stub of FIG. 4. When an action request message is received by the stub, the arguments and instance identifiers must be marshalled into a communications message. This is typically accomplished by native remote procedure call routines accessed by Network Information Definition Language (NIDL) statements, which define the action request message to the remote procedure call routines. The marshalled message is then sent, or exported, to the server stub on the remote computer. The server stub reverses the marshalling and sends the message to the server object. The server object returns the behavior to the server stub, which returns the behavior to the client stub. The client sub imports the behavior, and returns the behavior to the client object.

In an object-oriented computing environment, the object-to-object call mechanisms require a connectioned, or synchronous relationship, implying a synchronous relationship across the communication linkage. See FIG. 6. When an object calls another, the two objects are synchronously related because of the call mechanism. If the two objects are on different platforms, and the call is performed using RPC, this same relationship is maintained.

When multiple object-to-object calls are active at the same time, these calls are independent of each other. This fact, when placed in a communications relationship, results in many independent or concurrent threads of processing, each requiring its own communications session and management. In RPC this is performed by a client and server. These multiple sessions may be compressed into the same communications path, but each is managed as an individual session.

Unit-of-Work Processing

A major advancement in preserving data integrity of object oriented computing environments is the "unit-of-work". The unit-of-work is an object class including multiple unit-of-work objects and multiple unit-of-work instances. The unit-of-work allows the object oriented database system to manipulate, update, allocate and discard memory in terms of sets of objects and operations upon objects, rather than by manipulating memory pointers as in traditional languages like C and Pascal.

The unit-of-work and its operation are described in detail in application Ser. No. 07/425,607 to Abraham et al., filed Oct. 23, 1989, entitled *Unit-of-Work for Preserving Data Integrity of a Database*, and assigned to the assignee of the present invention, the disclosure of which is hereby incorporated herein by reference. As described therein, the object manager includes a unit-of-work manager. The unit-of-work manager assigns a unit-of-work instance to each task to be performed by copying the objects which are to be processed during a database task into a unit-of-work instance. A version of the object instances in the unit-of-work instance, referred to as a unit-of-work level, is created for each step in the task. Each unit-of-work level for a task includes a copy of the objects which are to be modified by the task. Each step in the task is controlled to modify the object comprises in the associated unit-of-work level, rather than the objects themselves. The unit-of-work class also includes associated methods for "commit", "discard", "new", "notify", "rollback", "start" and "switch". These methods allow the unit-of-work instance to be manipulated as a whole to ensure integrity.

As described above, an object oriented computing environment typically includes an object management table which is used to keep track of all the objects which are currently being used. The use of an object management table in connection with the unit-of-work is described in application Ser. No. 07/602,442 filed Oct. 23, 1990 to Shackelford et al. entitled *A Messenger and Object Manager to Implement an Object Oriented Environment*, assigned to the assignee of the present invention, the disclosure of which is hereby incorporated herein by reference. The object management table is used to manage the creation of new unit-of-work instances and to manage the creation of new unit-of-work levels within a unit-of-work instance. Switching, commits and rollbacks of unit-of-work levels and instances are also managed.

When a logical segment of contextual processing completes, all of the objects (data) that have been updated must be written to persistent storage, as shown in FIG. 7. This means that the work is to be committed, or completed. Once this data has been committed, recovery is no longer possible on the data that changed. When this happens, the processing is considered completed. This sequence is called a unit-of-work, or logical unit-of-work.

Logical unit-of-works that are associated contextually into a business process, must be also managed by the contextual process unit-of-work to assure recovery and data integrity across the entire context of the business process. See FIG. 8. When used in a business process, each unit-of-work must be associated with the context in which it is used. This context, with the event and result, is what defines the business process. Business processes may be executed across distributed processors. Logical unit-of-work may not. See application Ser. No. 08/009,170 to Elder et al. entitled *Business Process Objects in an Object Oriented Computing Environment* (Attorney Docket AN9-92-003), assigned to the assignee of the present invention, the disclosure of which is hereby incorporated herein by reference.

The logical unit-of-work is the atomic unit for distribution of a process. Management of each standalone logical unit-of-work must be accomplished at the object manager level on each of the distributed platforms.

In a cooperative or distributed computing environment, a logical unit-of-work may be required to span communications and processing boundaries. This greatly increases the complexity of unit-of-work and recovery of data shared across these boundaries. FIG. 8 shows a Business Process that is capable of a spanned or shared unit-of-work, whose context must be maintained.

For example, when a workstation acts as a cooperative processor, it by nature will be asked to process those data objects that deal with the user interface, navigation, sequencing and selection of management of the user direction. Enterprises will require certain actions on certain objects to be performed in a repetitive manner, such that a managed process is available, driven from the user interface. The notion of a business process implies that any given object-action in that process now has a relationship to other object-actions in that repeatable process. The process has imposed a contextual relationship between the objects and the changes that may take place with those objects. This process, or contextual unit must be managed for recovery and integrity.

Cooperative or distributed processing requires that the process be divisible along process boundaries that can allow the management of the logical unit-of-work. If these data integrity boundaries are ignored, data distribution becomes impossible and dangerous to the data.

Figure 9:
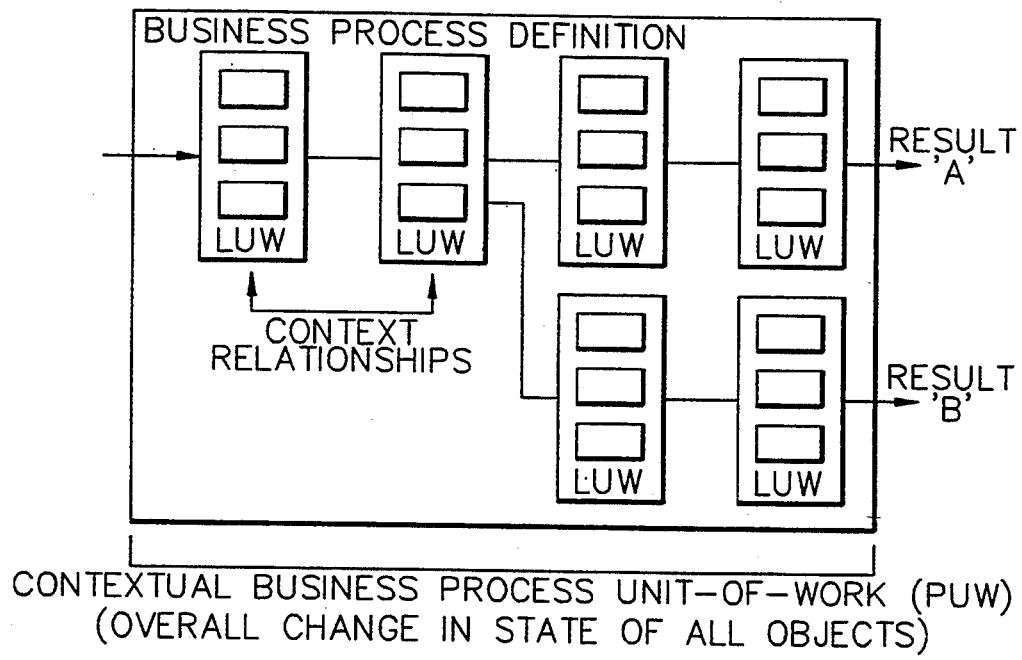
FIG. 9 schematically illustrates how individual units-of-work make up an overall change to persistent objects within a business process.

The logical unit-of-work of a persistent object (data), is keyed upon certain changes of state of that persistent object. That logical unit-of-work can stand alone if that persistent object is used alone. When a persistent object is used in context with other persistent objects in a procedural (business process) sequence, then it becomes a part of a larger overall process unit-of-work (PUW). Changes to any persistent object in that process unit-of-work must maintain the context of change to the overall business process. If not, a data integrity exposure exists, since the business process data is out of sync. FIG. 8 and FIG. 9 show the relationship between a business process and the contained logical unit-of-work.

As shown in FIG. 9, the individual units-of-work make up an overall change to the persistent objects when within the context or behavior of the business process. This overall change of state must be managed as a recovery constraint in process unit-of-work management processes. For example, the change to any individual object may not be in context with the overall context. All associated object instantiations for a business process must remain in context (synchronized), or the process unit-of-work has been violated, and a data integrity problem exists.

Recovery to both process unit-of-work and logical unit-of-work boundaries is based on the structure of the business process(es) represented by the process unit-of-work that was being performed at the time of the failure. For example, in the CICS environment, nested business process(es) must execute as a subtask of the parent business process. In that context, a nested business process may fail without terminating the parent task. Therefore, the parent task, through business process logic definitions, must manage the effect on itself. For example, recovery with restart within a PUW is to the completed state of the last successful LUW/PUW. A failed LUW within a parallel PUW would cause the failed LUW to recover/restart until completed, or fail the PUW with the LUW failure code, and return that code back to the parent (spawning) PUW for analysis and action. The parent PUW would then have to either abort (i.e. terminate with rollback) the failed PUW or decided to restart it.

There are numerous recovery operations and implications based on the type of failure/recovery capabilities and or support. These implications deal with resource management capabilities provided as a result of implementation of the unit-of-work support. Other platforms may have different implications.

Cooperative Processing

Cooperative processing occurs when two or more computing platforms cooperate to accomplish a task. Cooperative processing has been implemented in many ways. It is recognized as one of the many ways of increasing performance or processing capacity. However, there is more to cooperative processing than merely splitting up the work and spreading it around a network. Cooperative processing is a specialized form of Distributed processing. It requires a greater degree of interlocking of the process and the mechanisms that are used to provide the cooperative interconnections. Any splitting of the work must be at a point capable of synchronization of the LUWs being cooperatively processed.

For cooperative processing in an object oriented computing environment, an object manager must exist on both sides of the cooperative interconnection, and must have the capability to manage a processing unit-of-work that has components on both sides of the interconnection. Unit-of-Work recovery and commit must be such that a cooperative unit-of-work is not completed until all components are completed in the intended context of the LUW.

The design of any cooperative processing implementation, whether from host to workstation, or host to host, must be based upon the premise that the two segments of the system are aware of each other, and have the capability to determine their work flow and capabilities. The two participants must communicate information and status that is shared across the work being performed. In order for this information to flow properly and allow coordination of work, this communication must follow a conversational communications relationship.

Figure 10:
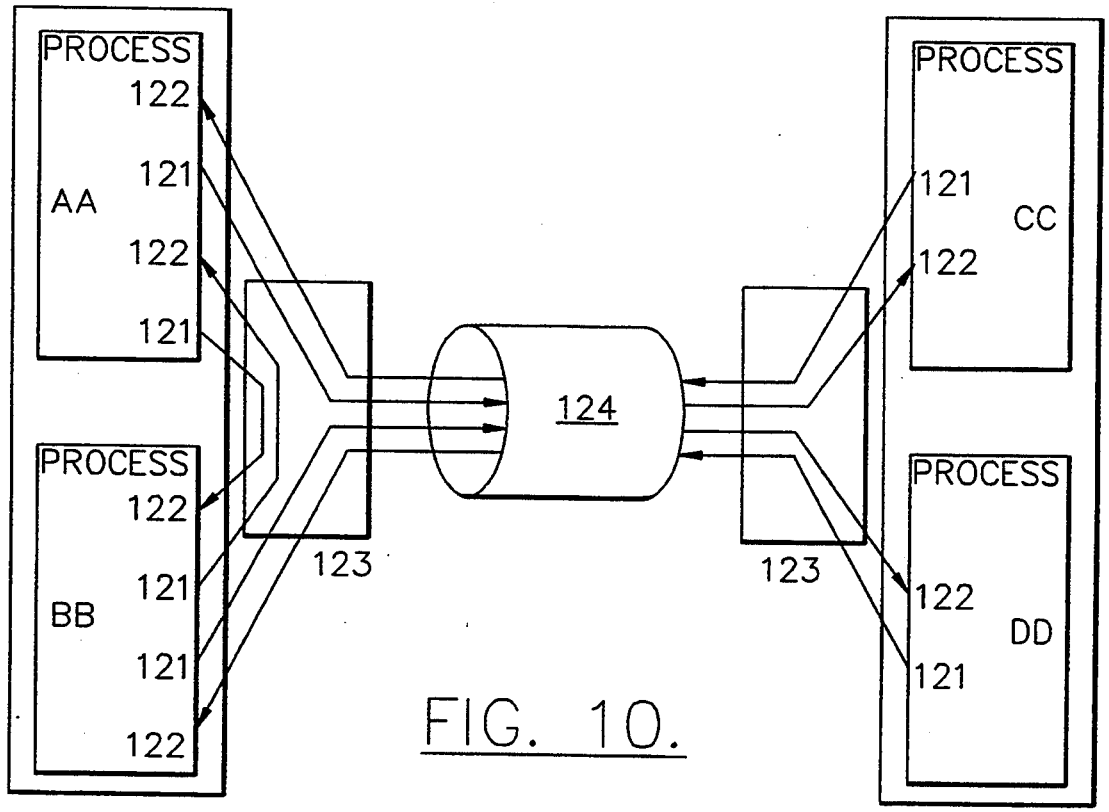
FIG. 10 schematically illustrates a generalized conversational or cooperative relationship between computing platforms.

The generalized conversational, or cooperative relationship, as shown in FIG. 10, allows for function-to-function communications, whether though networking, or on the same computing platform. Conversations are between cooperating functions. Accordingly, these functions must be aware that they are cooperative. This is different than function using the call relationship, where the caller and the callee are not contextually aware (i.e., they do not know who or what calls them) of each other, and are generally considered to be connectionless, or independent.

Cooperative functions are designed to be cooperative. They have knowledge that a peer exists that can be used to assist in processing, and they are aware that that peer may request processing. In other words, cooperative processing implies that two or more processors are cooperating to perform the intended function. Since there is cooperation, this implies that each process is cognizant of the other processors, and that they are in coordination with each other. These two implications are supported by a conversational communications relationship between processors. As shown by reference number 122, the friend (cooperative function) answers, and the operator presents the request to the friend.

The data flow in a generalized conversational model is illustrated in FIG. 10. As shown at 121, a function initiates, or requests a conversation with another cooperative function, using the conversational syntax of the communications subsystem. This is analogous to calling a friend on the telephone, person-to-person using an operator. As shown at 122, the friend (cooperative function) answers, and the operator presents the request to the friend. The cooperative function then either accepts (binds) or rejects the request for the conversation (like people, functions can reject the conversation). As shown at 123, once the conversation is accepted by both parties (bound), the operator (network management logic) makes the connection, and the conversation begins.

According to the agreed-to terms of the conversation, information now begins to flow on the bound session (conversation). The conversation (depending on the agreement), can be in both directions (duplex) or one way at a time (simplex). Like the phone call analogy, the operator (network controls) can monitor the call for errors, invalid (outside the agreement) exchanges, or for a notification from either of the participants that the conversation is completed. Finally, as shown at 124, the network transportation mechanism (analogous to the phone system) manages the connectivity and flow of the conversation. This allows many conversations on a single wire.

Object Oriented Cooperative Processing Using Linked Object Managers

In the object oriented paradigm, applications are sets of objects. These objects share their information and behavior by calling other objects, in some coordinated overall behavior (either by a user action or business process) to accomplish the desired effect on the data (normally termed a unit-of-work). These calls are independently processed by an object manager that performs the control, recovery, and routing management of these object-to-object messaging calls.

Figure 11:
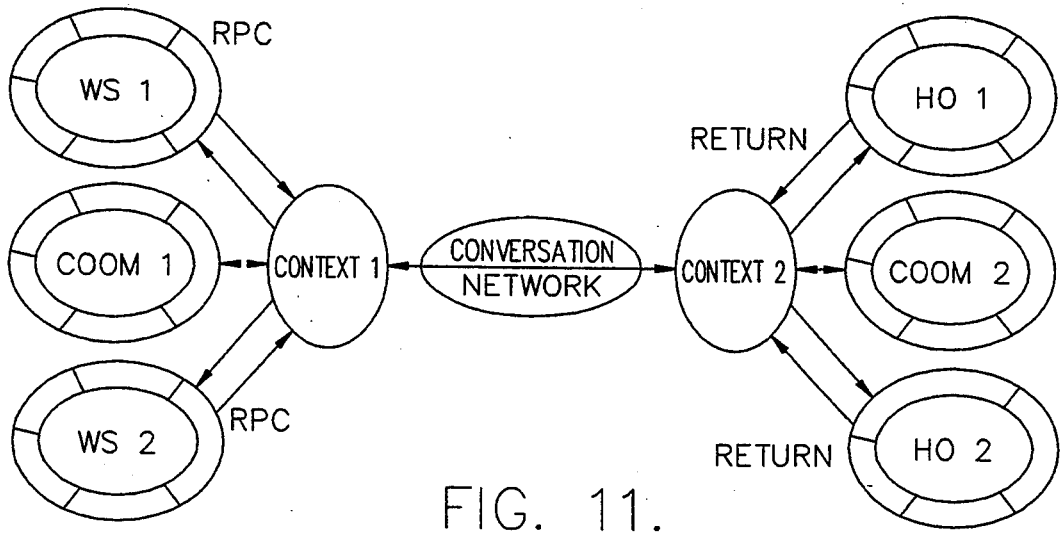
FIG. 11 illustrates an overall block diagram of an embodiment of the present invention.

FIG. 11 illustrates an overall block diagram of the present invention. As shown, when a conversational, cooperative processing management capability is added to the object-to-object call relationship, a standardized, portable, object oriented cooperative interface can be achieved, which will enable the contextual management of the object-to-object calls within a unit-of-work. The object manager, as the object's agent, is the processor that must be made cooperative if the overall application process (object-to-object object-action message calls) is to be made cooperative. The object managers must also coordinate the overall processing context between them using the conversation established.

Since the call relationship, supported by the connectionless remote procedure call, is used in conjunction with the cooperative object managers, the objects themselves, however, remain ignorant off the whereabouts of any given target object, and remain contextually independent. The object manager-to-object manager coordination will be implemented using a conversational relationship, utilizing conversational server stubs, acting in conjunction with the remote procedure call relationship used to route and manage the object-to-object message calls targeted to remote objects.

It will be understood by those having skill in the art that cooperative function (processing) distribution may be varied, based on the processing capabilities of the cooperating participants. For example, a LAN-connected workstation has much more processing capability than a workstation that simply provides the user interface. More function can be distributed to the LAN-connected workstation.

Linking of Object Managers for Cooperative Processing

Figure 12:
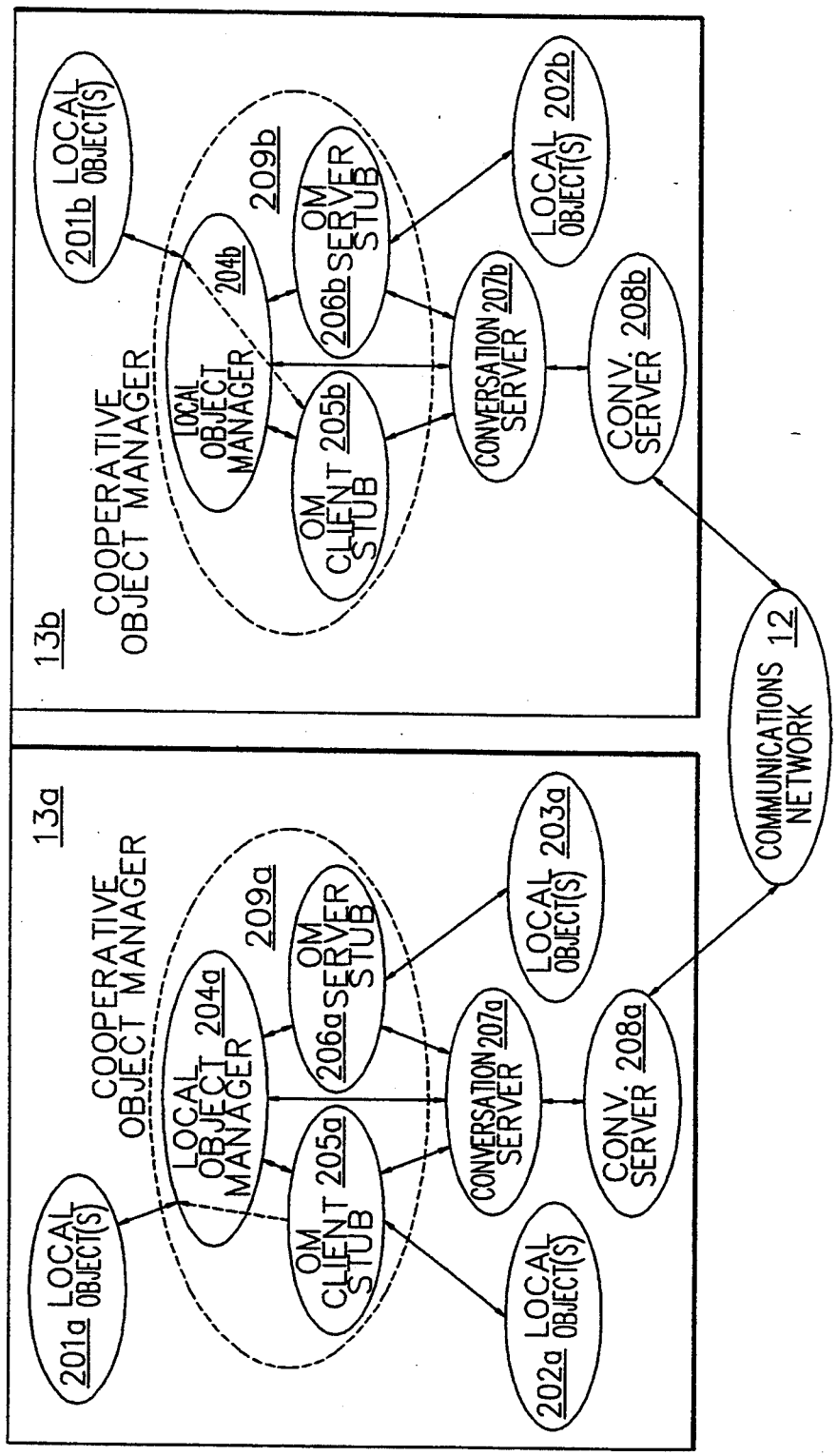
FIG. 12 illustrates a detailed schematic diagram of an embodiment of the present invention.

Referring now to FIG. 12, linking of object managers for cooperative processing in an object oriented computing environment according to the present invention will now be described. As shown in FIG. 12, two object oriented computing environments 13a and 13b are shown. It will be understood that each object oriented computing environment 13a, 13b executes on a first and second computing platform 12a, 12b respectively (FIG. 1). The first object oriented computing environment includes a plurality of first objects 201a, 202a and 203a and the second object oriented computing environment 13b includes a plurality of second objects 201b, 202b. For purposes of clarity, the objects in object oriented computing environment 13a are referred to as "local objects" whereas the objects on computing environment 13b are referred to as "remote objects". However, the objects are all conventional objects which execute on their respective computing platform, with the terms "local" and "remote" referring to the specific object's affinity to the object manager and remote procedure call which will be described below. When a remote procedure call originates from computing platform 13b then objects 201b and 202b are local objects and objects 201a, 202a, and 203a are remote objects.

Still referring to FIG. 12, each object oriented computing environment 13a, 13b includes a cooperative object manager 209a, 209b respectively. Each cooperative object manager includes a local object manager 204a, 204b for directing action messages between its respective objects 201a, 202a, 203a, and 201b, 202b. A communications network 12 is also included for communicatively connecting the first object oriented computing environment 13a and the second object oriented computing environment 13b.

As shown in FIG. 12, each cooperative object manager 209a, 209b includes an object manager client stub 205a, 205b for identifying a first action message from an associated object which is directed to a remote object. Thus, client stub 205a identifies messages from objects 201a, 202a, or 203a which are directed to objects 201b or 202b. Similarly, client stub 205b identifies messages from objects 201b or 202b which are directed to objects 201a, 202a, or 203a. Similarly, each cooperative object manager includes an object manager server stub 206a, 206b, which unmarshals messages from objects outside its own computing platform and converts these messages to the local syntax and directs these messages to the appropriate object on its own computing platform.

Each object oriented computing environment 13a, 13b also includes a conversation server 207a, 207b respectively. The conversation server allows local object manager to local object manager cooperative communication, by determining whether a local object which is called by a remote object has successfully performed the action message from a remote object which called it, and provides the local object manager an indication whether the action message has been performed successfully. Thus, the local object manager can keep track of changes in remote objects which are associated with a unit-of-work which is controlled by the local object manager and thus implement cooperative processing.

Operation of cooperative processing using the system of FIG. 12 will now be described. For purposes of this example, it will be assumed that local object manager 204a initiates a conversation with remote object manager 204b, and therefore the terms "local object manager" and "remote object manager" will be used. However, it will be understood by those having skill in the art that initiation can also come from object manager 204b to object manager 204a so that object manager 204b acts as a local object manager and object manager 204a acts as a remote object manager.

Cooperative processing begins when a cooperative object manager, 209a, initiates or requests a conversation with another cooperative object manager 209b using the conversational syntax of the communications network 12. The remote cooperative object manager 209b responds and accepts or rejects the request for the conversation.

Once the conversation is accepted, the communications services objects for the conversational communications driver establishes the session and the conversation begins. The conversation occurs in both directions simultaneously to fully support the independent call requirements of the object-to-object remote procedure call messaging and to support the cooperative object manager to cooperative object manager unit-of-work and recovery messages. The communication services conversational drivers monitor the session for errors and network failure. The conversations between the cooperative object managers 209a and 209b consist of the message requests of the remote procedure calls which are being sent and received by the cooperative object manager client and server stubs 205a, 205b and 206a, 206b. Thus, as shown in FIG. 12, the conversation server 207a, 207b directly communicates to the associated local object manager 204a, 204b, the message requests of the remote procedure calls which are sent and received by the cooperative object manager client and server stubs 205a, 205b and 206a, 206b.

The remote procedure call flow of FIG. 12 is similar to that already described in connection with FIG. 3. In particular, for a remote procedure call which is directed from object oriented computing platform 13a to object oriented computing platform 13b, a local object such as object 201a sends a message to local object manager 204a, directed to another object which is not on computing platform 13a. Object manager 204a calls client stub 205a. The client stub appears to the client process at the actual server process that it wants to call. The client stub 205a marshals the call arguments for the call to the remote server process. Thus, the client stub 205a builds a packet containing the object-action message to be routed to the remote object. The marshalled streams are then sent to conversation server 207a which routes the stream to conversation driver 208a and to communications network 12 using networking mechanisms.

The remote network conversation driver and conversation driver 208b and 207b route the message to the server stub 206b of the remote object oriented computing environment 13b. The server stub 206b performs the unmarshalling of the network streams into the arguments and formats required by the server process. The server stub 206b calls the appropriate object such as object 202b via the local object manager 204b. The remote object 202b performs the method the data and returns the results to the server stub 206b. The server stub 206b marshals the returned result into one or more network format streams and sends them back to the networking routines via conversation server 207b and conversation driver 208b. The communications network 12 and network transport mechanisms 208a and 207a route the return back to the originating system and to the client stub 205a. Finally, client stub 205a unmarshals the return and returns it to the client object 201a. Thus the process appears to the client object 201a to be a normal procedure call to another local process.

Detailed Implementation of Cooperative Object Processing

Referring now to FIGS. 13-17, detailed operations performed by cooperative object managers 209a, 209b of FIG. 12 according to the present invention will now be described.

Figure 13:
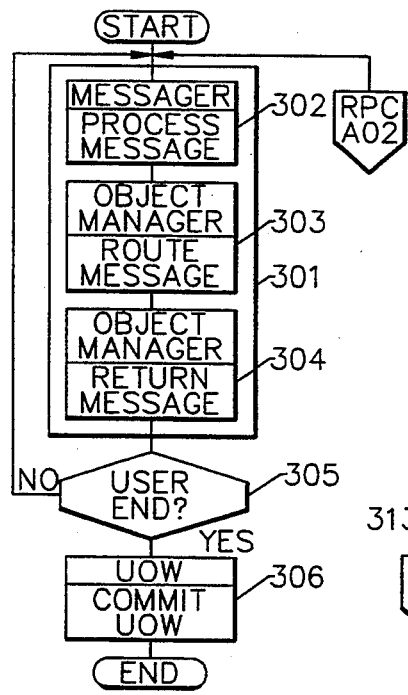
FIG. 13-17 illustrate detailed operations performed by cooperative object managers according to the present invention.

Referring now to FIG. 13, operations performed for normal (noncooperative) object manager operation will now be described. This relationship between objects is totally independent of the relationship between any other objects, and follows the call model. All messages are originally initiated by a user selection. At Block 302, a messager (sometimes named a messenger) receives and routes an object-action message from an object 201a, 202a or 203a to the object manager 204a. The object manager 204a determines the state of the target object, and ensures that the instance is materialized. The object manager then routes the message to the target object at Block 303. The target object's method executes the message, and returns the result, if any, in the message at Block 304. The object manager 204a returns the message to the originating object. At Block 305, if the session is continued, another object and action is selected which initiates another object-action message to the object manager. Processing of Block 301 is repeated. Alternatively, if the user ends the session, all work performed must be committed to the database at Block 306.

Figure 14:
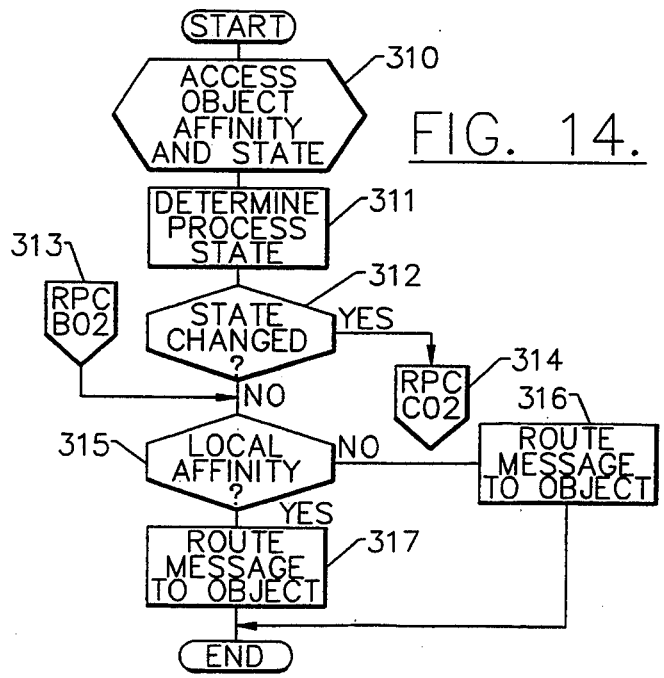

Referring now to FIG. 14, in a cooperative environment, the object manager must determine not only the state of an object, but it's affinity (proximity to the processing object manager) and location. In order to coordinate work (modification to objects) that are in different locations, the owning object manager (local proximity to the originating object) must be notified of any modifications done to objects on it's behalf.

Referring to Block 310, the affinity of the target object is determined by attributes of the object/class. Affinity is an instantiated object's location with respect to the processing object image. Affinity is used to determine whether the message must be routed outside of the local computing environment. The processing state of the object is determined so that state changes can be detected. The processing state of an object is its measurement of change. For example, when an object is instantiated, no change in its data can have taken place. However, if a method has been executed, the object's "processing state" has changed, and this information must be recorded. At Block 311, the recorded (last) state of the object is accessed, and at Block 312, the new (current) state is compared. If they are different, the "processing state" of the object has changed. Each change must be recorded, in the sequence it was performed. In the event of a rollback, these "states" must be undone in the reverse order, to restore the original state.

If the processing state (it's data) of the target object has changed (Block 312), the unit-of-work for that user session must be updated (Block 314) to reflect that change so that the object's context (point in processing) is known. This update will be described in FIG. 15. If the state has not changed, the affinity of the object (Block 315) is used to route the message to the object (Blocks 316, 317). If the object is not local, networking facilities would be used to route the message. If the object is local, normal message delivery is used.

Figure 15:
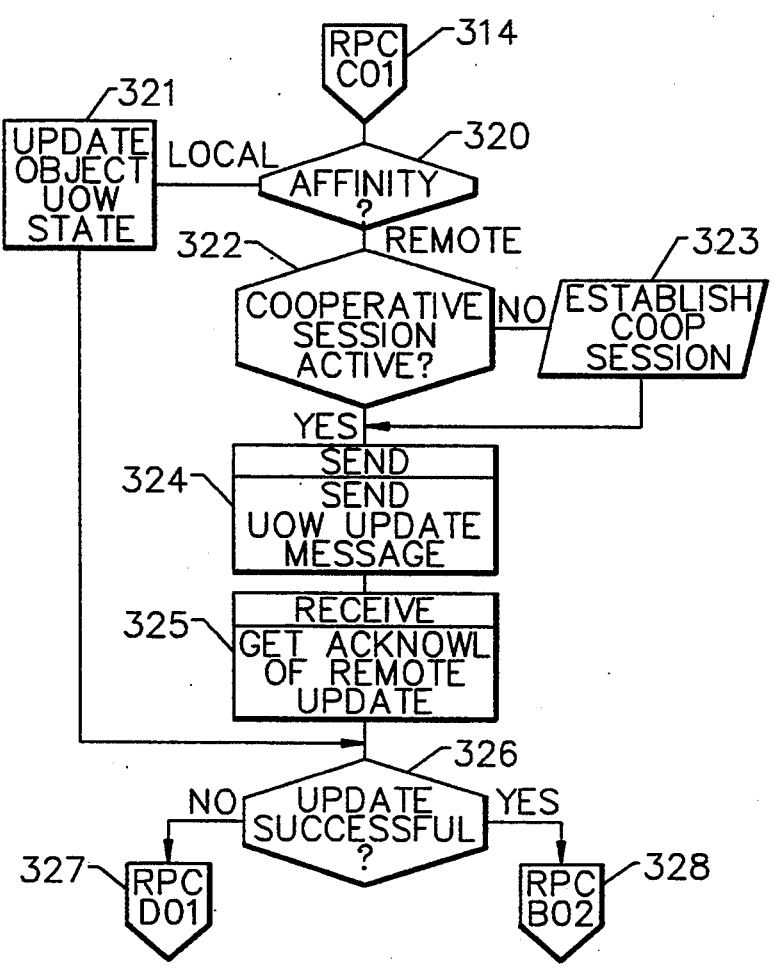

Referring now to FIG. 15, the unit-of-work for a user session must be updated whenever an object's state changes in the context of that session. This must be done for cooperative processing as well, and must be managed independently of object-to-object messaging. As shown in FIG. 15, the affinity (location) of the object whose state has changed is used at Block 320 to determine the location of the unit-of-work processing synchronization and context management. For example, if the object's affinity is local, the local unit-of-work is assumed to be in control, and is updated at Block 321.

If the object has a remote affinity, the remote unit-of-work must be notified to synchronize the context management. To do this, a cooperative (conversational) session between the object manager of the remote object and the local (processing) object manager is established (Block 323) if one does not already exhibit (Block 322). A UOW update message is sent to the remote object manager using the cooperative session at Block 324, providing the update information for unit-of-work context management. The UOW update message indicates successful completion of the message by the remote object. For example, the UOW update message may be configured as an object-action message, in the context of the UOW, as follows:

From: OM"1" TO OM"2":
   REF: "UOW #123":
      "OBJECT INSTANCE ABC, METHOD DEF WAS SUCCESSFUL":

OM"2" would then update its UOW table for UOW "123" to indicate that the method "DEF" had executed against object instance "ABC". This represents a "state change" for "ABC". Both OM"1" and OM"2" would include UOW "123" in their respective UOW tables, as well as an indication of those object ID's which were processed. This information is typically part of existing UOW management.

An acknowledgement of the remote UOW update is received at Block 325, and the local object manager updates the object's state, for example to show that the object's data was checkpointed. If the update was successful (Block 326), normal object manager processing is resumed (Block 313). If the update was unsuccessful, the modification must be undone, or the data for the object rolled back to its's previous state. See Block 327 and FIG. 16.

Figure 16:
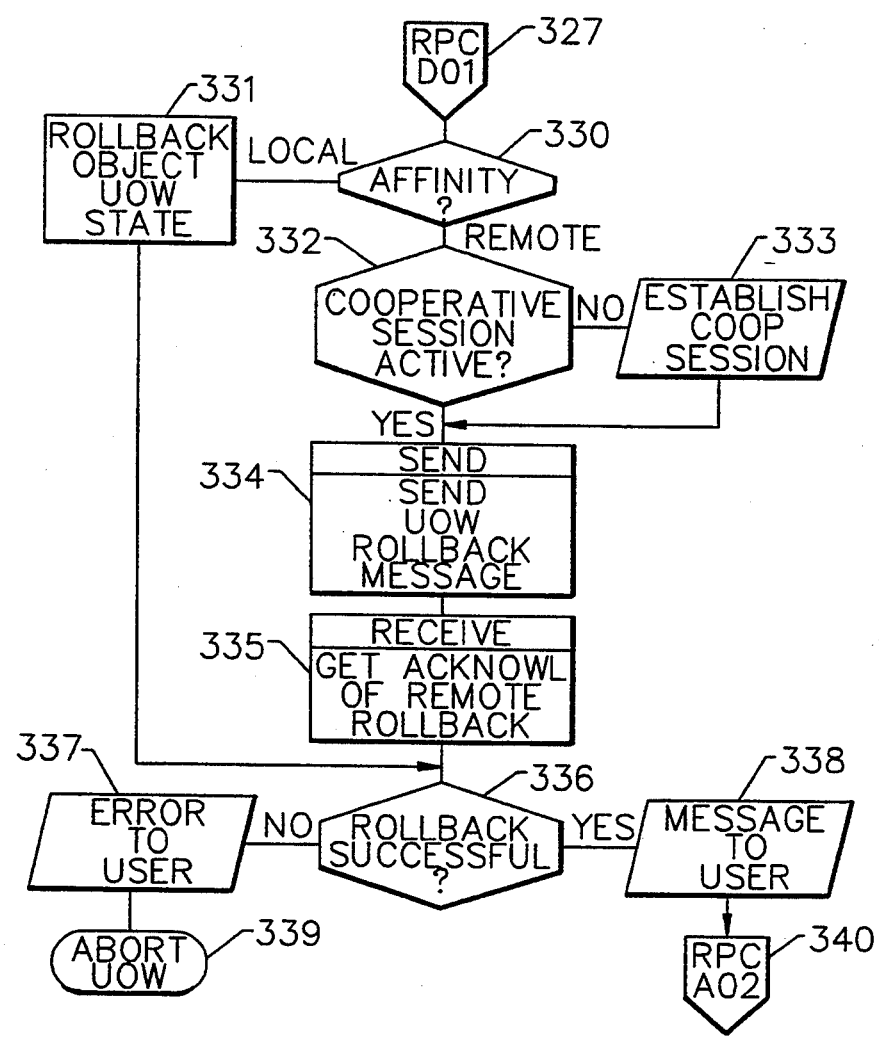

Referring now to FIG. 16, operations for cooperative UOW rollback will now be described. The affinity (location) of the object whose state has changed is used to determine the location of the Data management services processing unit at Block 330. For example, if the object's affinity is local, the local data management services is assumed to be in control and rollback occurs at Block 331. If the object has a remote affinity, the remote unit-of-work must be notified to synchronize the context management. To do this, a cooperative (conversational) session between the object manager of the remote object and the local (processing) object manager is established at Block 333 if one does not already exist (Block 332). A rollback message is sent to the controlling unit-of-work for context update(s) at Block 334. An acknowledgement of the remote UOW update is received at Block 335, and the local object manager updates the object's state, for example to show that the object's data was rolled back to the last checkpoint). If the rollback was successful (Block 336), object manager processing is resumed according to the context defined for the unit-of-work. For example, a message is sent to the user at Block 338 and the failed process is retried at Block 340. If the rollback was unsuccessful (Block 336), error recovery must be performed according to the controlling unit-of-work context. For example, an error message is set to the user (Block 337) and the UOW is aborted (Block 339).

Figure 17:
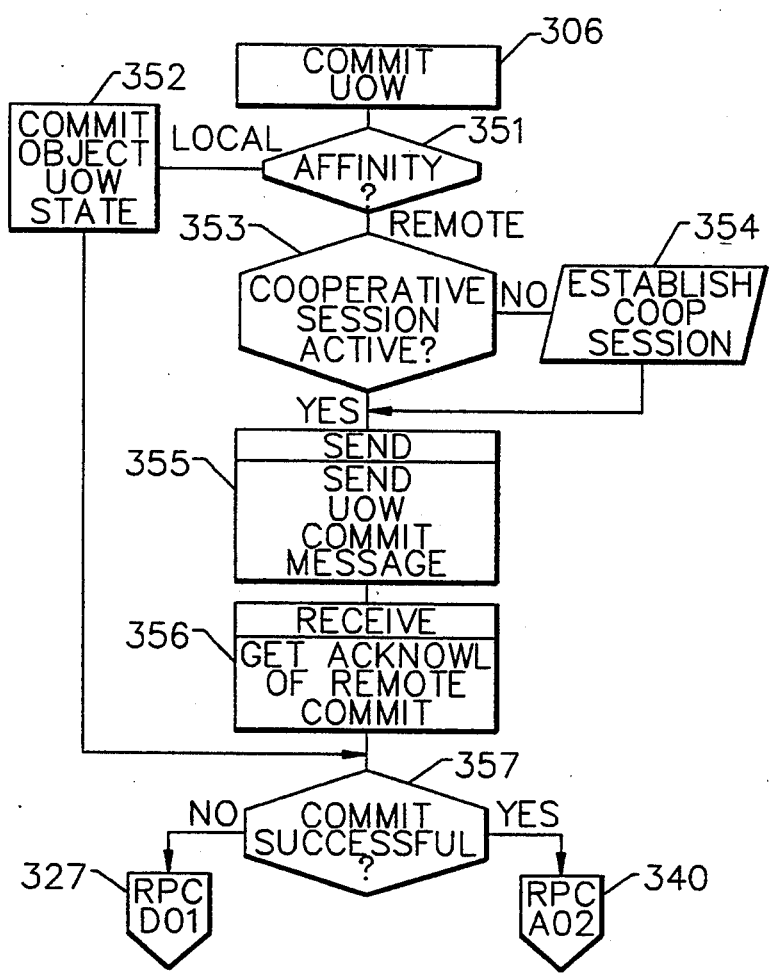

Referring now to FIG. 17, operations to commit a cooperative UOW (Block 306 of FIG. 13) will now be described. At Block 351, the affinity (location) of the object whose state has changed is used to determine the location of the data management services processing unit. If the object's affinity is local, the local data management services is assumed to be in control and the commit is performed at Block 352. If the object has a remote affinity, the remote unit-of-work must be notified to synchronize the context management. To do this, a cooperative (conversational) session between the object manager of the remote object and the local (processing) object manager is established (Block 354) if one does not already exist (Block 353). A commit message is sent to the controlling unit-of-work for context update(s) at Block 355. An acknowledgement of the remote UOW update is received at Block 356, and the local object manager updates the object's state, for example to show that the object's state was rolled back to the last checkpoint. If the commit was successful (Block 357), object manager processing is resumed (Block 327) according to the context defined for the unit-of-work. For example, the next process is started. If the commit was unsuccessful, Block 340 error recovery must be performed according to the controlling unit-of-work context. For example, the unit-of-work is aborted.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An object oriented cooperative data processing system comprising:
   a first computing platform;
   a first object oriented computing environment executing on said first computing platform, said first object oriented computing environment comprising:
      a plurality of first objects, each including associated data and at least one method; and
      a first object manager including means for directing action messages between said plurality of first objects;
   a second computing platform;
   a second object oriented computing environment executing on said second computing platform, said second object oriented computing environment comprising:
      a plurality of second objects, each including associated data and at least one method; and
      a second object manager including means for directing action messages between said plurality of second objects; and
   means for communicatively connecting said first computing environment and said second computing environment;
   said first object manager further comprising:
      means for identifying a first action message from one of said first plurality of objects which is directed to one of said second plurality of objects; and
      means, responsive to said identifying means, for transmitting said first action message to said one of said second objects via said connecting means;
   said second object manager further comprising:
      means for determining whether said one of said second objects successfully performed said first action message; and means, responsive to said determining means, for providing to said first object manager an indication of whether said one of said second objects successfully performed said first action message.

2. The object oriented cooperative data processing system of claim 1 wherein said second object manager further comprises:
   second means for identifying a second action message from one of said second plurality of objects which is directed to one of said first plurality of objects; and
   means, responsive to said second identifying means, for transmitting said second action message to said one of said first objects via said connecting means; and
   wherein said first object manager further comprises:
      second means for determining whether said one of said first objects successfully performed said second action message; and second means, responsive to said second determining means, for providing to said second object manager an indication of whether said one of said first objects successfully performed said second action message.

3. The object oriented cooperative data processing system of claim 1 wherein said first object manager further comprises means for assigning selected ones of said first objects and selected ones of said second objects to a unit-of-work; and wherein said second providing means further comprises means for providing to said first object manager a unit-of-work identification associated with said one of said second objects, along with said indication of whether said one of said second objects successfully performed said first action message.

4. The object oriented cooperative data processing system of claim 2 wherein said second object manager further comprises means for assigning selected ones of said first objects and selected ones of said second objects to a unit-of-work; and wherein said providing means further comprises means for providing to said second object manager a unit-of-work identification associated with said one of said first objects, along with said indication of whether said one of said first objects successfully performed said second action message.

5. The object oriented cooperative data processing system of claim 1 wherein each of said indications comprises one of a successful completion code and an error code.

6. An object oriented cooperative data processing system comprising:
   a first computing platform;
   a first object oriented computing environment executing on said first computing platform, said first object oriented computing environment comprising:
      a plurality of first objects; and
      first means for managing said plurality of first objects;
   a second computing platform;
   a second object oriented computing environment executing on said second computing platform, said second object oriented computing environment comprising:
      a plurality of second objects; and
      second means for managing said plurality of second objects; and
   means for communicatively connecting said first computing environment and said second computing environment;
   said first object managing means comprising:
      first means for indicating to said second object managing means, whether successful performance by said first objects of messages from said second objects has occurred; and
      first means for receiving from said second object managing means, indications of whether said second objects successfully performed messages from said first objects;
   said second object managing means comprising:
      second means for indicating to said first object managing means, whether successful performance by said second objects of messages from said first objects has occurred; and
      second means for receiving from said first object managing means, indications of whether said first objects successfully performed messages from said second objects.

7. The object oriented cooperative data processing system of claim 6:
   wherein said first object managing means further comprises means for assigning selected ones of said first objects and selected ones of said second objects to a unit-of-work; and wherein said first indicating means further comprises means for indicating to said second object managing means a unit-of-work identification associated with said one of said first objects, along with said indication of whether said one of said second objects successfully performed messages from said first objects; and
   wherein said second object managing means further comprises means for assigning selected ones of said first objects and selected ones of said second objects to a unit-of-work; and wherein said second indicating means further comprises means for indicating to said first object managing means a unit-of-work identification associated with said one of said second objects, along with said indication of whether said one of said first objects successfully performed messages from said second objects.

8. The object oriented cooperative data processing system of claim 1 wherein each of said indications comprises one of a successful completion code and an error code.

9. An object oriented cooperative data processing system comprising:
   a first computing platform;
   a first object oriented computing environment executing on said first computing platform, said first object oriented computing environment comprising:
      a plurality of first objects, each including associated data and at least one method; and
      a first local object manager including means for directing action messages between said plurality of first objects; a second computing platform;
   a second object oriented computing environment executing on said second computing platform, said second object oriented computing environment comprising:
      a plurality of second objects, each including associated data and at least one method; and
      a second local object manager including means for directing action messages between said plurality of second objects; and means for communicatively connecting said first computing environment and said second computing environment;

said first object oriented computing environment further comprising:
- a first client stub for identifying a first action message from one of said first plurality of objects which is directed to one of said second plurality of objects; and
- a first conversation server, responsive to said first client stub, for transmitting said first action message to said one of said second objects via said connecting means;

said second object oriented computing environment further comprising a second conversation server for determining whether said one of said second objects successfully performs said first action message, and for providing to said first local object manager an indication of whether said one of said second objects successfully performed said first action message.

10. The object oriented cooperative data processing system of claim 9 wherein said second object oriented computing environment further comprises:
- a second client stub for identifying a second action message from one of said second plurality of objects which is directed to one of said first plurality of objects; and
- wherein said second conversation server is responsive to said second client stub, for transmitting said second action message to said one of said first objects via said connecting means; and
- wherein said first conversation server further comprises means for determining whether said one of said first objects successfully performs said second action message, and for providing to said second local object manager an indication of whether said one of said first objects successfully performed said second action message.

11. The object oriented cooperative data processing system of claim 10 wherein said first local object manager further comprises means for assigning selected ones of said first objects and selected ones of said second objects to a unit-of-work; and wherein said second conversation server further comprises means for providing to said first local object manager a unit-of-work identification associated with said one of said second objects, along with said indication of whether said one of said second objects successfully performed said first action message.

12. The object oriented cooperative data processing system of claim 11 wherein said second local object manager further comprises means for assigning selected ones of said first objects and selected ones of said second objects to a unit-of-work; and wherein said first conversation server further comprises means for providing to said second local object manager a unit-of-work identification associated with said one of said first objects, along with said indication of whether said one of said first objects successfully performed said second action message.

13. The object oriented cooperative data processing system of claim 10 wherein each of said indications comprises one of a successful completion code and an error code.

14. An object oriented cooperative data processing system comprising:
- a first computing platform;
- a first object oriented computing environment executing on said first computing platform, said first object oriented computing environment comprising:
  - a plurality of first objects; and
  - first means for managing said plurality of first objects;
- a second computing platform;
- a second object oriented computing environment executing on said second computing platform, said second object oriented computing environment comprising:
  - a plurality of second objects; and
  - second means for managing said plurality of second objects; and
- means for communicatively connecting said first computing environment and said second computing environment;

said first object managing means comprising:
- first remote procedure calling means for directing action messages from said plurality of first objects to said plurality of second objects; and
- first means for cooperatively communicating with said second object managing means, independent of said first remote procedure calling means;

said second object managing means comprising:
- second remote procedure calling means for directing action messages from said plurality of second objects to said plurality of first objects; and
- second means for cooperatively communicating with said first object managing means, independent of said second remote procedure calling means.

15. A method for providing cooperative processing in an object oriented data processing system, said object oriented data processing system comprising:
- a first computing platform;
- a first object oriented computing environment executing on said first computing platform, said first object oriented computing environment comprising:
  - a plurality of first objects, each including associated data and at least one method; and
  - a first object manager including means for directing action messages between said plurality of first objects;
- a second computing platform;
- a second object oriented computing environment executing on said second computing platform, said second object oriented computing environment comprising:
  - a plurality of second objects, each including associated data and at least one method; and
  - a second object manager including means for directing action messages between said plurality of second objects; and
- means for communicatively connecting said first computing environment and said second commuting environment;

said cooperative processing method comprising the following steps performed by said first object manager:
- identifying a first action message from one of said first plurality of objects which is directed to one of said second plurality of objects; and
- transmitting said first action message to said one of said second objects via said connecting means;

said cooperative processing method further comprising the following steps performed by said second object manager:
 determining whether said one of said second objects successfully performed said first action message; and
 providing to said first object manager an indication of whether said one of said second objects successfully performed said first action message.

16. The method of claim 15 wherein the following steps are also performed by said second object manager:
 identifying a second action message from one of said second plurality of objects which is directed to one of said first plurality of objects; and
 transmitting said second action message to said one of said first objects via said connecting means; and
 wherein the following steps are also performed by said first object manager:
  determining whether said one of said first objects successfully performed said second action message; and
  providing to said second object manager an indication of whether said one of said first objects successfully performed said second action message.

17. The method of claim 15 wherein said first object manager further comprises means for assigning selected ones of said first objects and selected ones of said second objects to a unit-of-work; and wherein said providing step comprises the step of providing to said first object manager a unit-of-work identification associated with said one of said second objects, along with said indication of whether said one of said second objects successfully performed said first action message.

18. The method of claim 16 wherein said second object manager further comprises means for assigning selected ones of said first objects and selected ones of said second objects to a unit-of-work; and wherein said second object manager providing step comprises the step of providing to said second object manager a unit-of-work identification associated with said one of said first objects, along with said indication of whether said one of said first objects successfully performed said second action message.

19. The method of claim 15 wherein each of said indications comprises one of a successful completion code and an error code.

20. A method for providing cooperative processing in an object oriented data processing system, said object oriented data processing system comprising:
 a first computing platform;
 a first object oriented computing environment executing on said first computing platform, said first object oriented computing environment comprising:
  a plurality of first objects; and
  first means for managing said plurality of first objects;
 a second computing platform;
 a second object oriented computing environment executing on said second computing platform, said second object oriented computing environment comprising:
  a plurality of second objects; and
  second means for managing said plurality of second objects; and
 means for communicatively connecting said first computing environment and said second computing environment;
 said cooperative processing method comprising the following steps performed by said first object managing means:
  indicating to said second object managing means, whether successful performance by said first objects of messages from said second objects has occurred; and
  receiving from said second object managing means, indications of whether said second objects successfully performed messages from said first objects;
 said cooperative processing method comprising the following steps performed by said second object managing means:
  indicating to said first object managing means, whether successful performance by said second objects of messages from said first objects has occurred; and
  receiving from said first object managing means, indications of whether said first objects successfully performed messages from said second objects.

21. The method of claim 20:
 wherein said first object managing means further comprises means for assigning selected ones of said first objects and selected ones of said second objects to a unit-of-work; and wherein said second object managing means indicating step indicating further comprises the step of indicating to said second object managing means a unit-of-work identification associated with said one of said first objects, along with said indication of whether said one of said second objects successfully performed messages from said first objects; and
 wherein said second object managing means further comprises means for assigning selected ones of said first objects and selected ones of said second objects to a unit-of-work; and wherein said second object management means indicating step further comprises the step of indicating to said first object managing means a unit-of-work identification associated with said one of said second objects, along with said indication of whether said one of said first objects successfully performed messages from said second objects.

22. The method of claim 20 wherein each of said indications comprises one of a successful completion code and an error code.

* * * * *

UNITED STATES PATENT AND TRADEMARK OFFICE
CERTIFICATE OF CORRECTION

| | |
|---|---|
| PATENT NO. : | 5,377,350 |
| DATED : | December 27, 1994 |
| INVENTOR(S) : | Harold R. Skinner |

It is certified that error appears in the above-identified patent and that said Letters Patent is hereby corrected as shown below:

Column 4, line 60, in the sub-heading, delete "DRAWING" and insert --DRAWINGS-- therefor.

Column 6, line 26, after "having" insert --skill--.

Column 8, line 32, after "marshalling" insert a period (.).

Column 15, line 50, after "method" insert --on--.

Column 20, line 59, begin new paragraph with "a".

Column 22, lines 59-60, delete "commuting" and insert --computing-- therefor.

Signed and Sealed this

Twenty-fourth Day of February, 1998

*Attest:*

BRUCE LEHMAN

*Attesting Officer*  *Commissioner of Patents and Trademarks*